April 29, 1969

R. RAFANELLI 3,441,009

DEVICE FOR THE AUTOMATIC REGULATION OF THE
TIMING OF THE INLET AND EXHAUST VALVES OF
A FOUR-CYCLE INTERNAL COMBUSTION ENGINE

Filed May 18, 1967

3,441,009
DEVICE FOR THE AUTOMATIC REGULATION OF THE TIMING OF THE INLET AND EXHAUST VALVES OF A FOUR-CYCLE INTERNAL COMBUSTION ENGINE
Renzo Rafanelli, Via Maffia 13, Florence, Italy
Filed May 18, 1967, Ser. No. 639,467
Claims priority, application Italy, Oct. 20, 1966, 26,078/66
Int. Cl. F01l *13/00;* F02d *13/02*
U.S. Cl. 123—90          8 Claims

ABSTRACT OF THE DISCLOSURE

A device in which a pivotable lever is rotated in an amount related to the speed of a four-cycle internal combustion engine, the lever acting on a drive chain for cams controlling the operation of the exhaust and inlet valves of the engine such that the cams are subjected to a supplemental rotation related to the engine speed for advancing the closing of the exhaust valves and retarding the opening of the inlet valves as the engine speed decreases so that at low speeds there is substantially no overlap between the openings of the valves.

Brief summary of the invention

It is known that in four-cycle internal combustion engines, especially high speed engines of high compression ratio, a substantial advance is provided in the opening of the inlet valve and a great lag in the closing of the exhaust valve in relation to the upper dead center position of the piston. Consequently, a rather prolonged overlap of the open condition of the inlet and exhaust valves is obtained.

The duration of said overlap, which is constant at all speeds of the engine, is generally predetermined so as to provide the best operation at the maximum power of the engine and hence always at a high speed. It follows that at low speeds of the engine, a considerable quantity of hot burned gases is drawn in from the exhaust system together with the fresh air-fuel mixture coming from the carburetor during a large part of the suction stroke. Another disadvantage of such a valve timing arrangement is that at low engine speeds the mixtures used are richer in fuel than the power requirements of the engine. Moreover, these mixtures are unable to burn completely, because of a lack of oxygen. Consequently, at low engine speeds, the percentage of unburned hot gases is high, with an unnecessary consumption of fuel and above all with a high CO content which, because of its toxicity, is one of the principal causes of air pollution.

The present invention relates to a mechanical device which suitably corrects, especially at low engine speeds, the timing of the suction and exhaust valves, so that during the entire suction stroke of the piston, the exhaust valve is kept closed, thus avoiding the inflow of exhaust gas into the cylinder. Also, the opening of the inlet valve is delayed until the piston is at its upper dead center position, and the end of the suction stroke takes place some time after the upper dead center position of the piston whereby there is drawn into the cylinder a smaller quantity of air-fuel mixture, which is also less rich compared with operation at high speed, resulting in substantial saving of fuel.

The device according to the invention is automatically controlled as a function of the speed of the engine, so that the valve timing is that most suitable at the various speeds and the percentage of CO in the exhaust is always maintained within very low limits.

The device according to the invention comprises a first means responsive to the speed of the engine and a second means coupled to the first means and automatically regulating the timing of the valves in relation to the engine speed such that at engine idle speed the valves are open at separate times and there is no overlap between their openings.

The second means is constituted so as to impart a supplemental rotation on the cams controlling the valves, at slow speeds, to cause timing advance of the exhaust valve and timing lag of the inlet valve. At idle speed, when the piston is at the upper dead center position the inlet valve opens and the exhaust valve closes. There is no overlap between the opening of the valves. Only as the engine speed increases does an overlap in valve openings appear.

Detailed description of the invention

Figure 2:
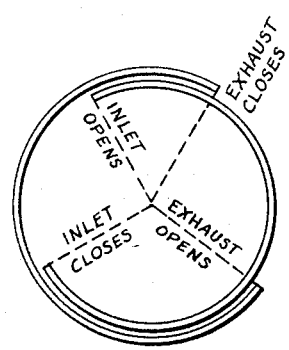
FIGURE 2 diagrammatically shows the suction and exhaust phases in the engine when operating at high speeds.
Figure 3:
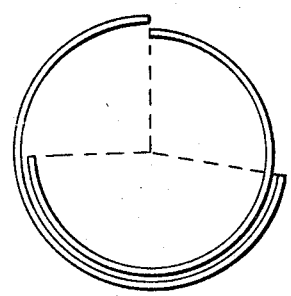
FIGURE 3 shows the diagram of the same phases, at low engine speeds.

Referring to the drawing, the device consists of a cross-shaped lever 1 mounted loosely on a cam shaft 2 of exhaust valve 3. The lever has two arms 1*a* and 1*b* which lie in a plane parallel to and facing that of the drive chain 5. The arms 1*a* and 1*b* carry at their ends sprockets 4 and 4′, respectively, engaging said chain 5 and serving to stretch the chain which, in any event, is a little longer than normal, to permit greater than normal rotation of gear systems 6 and 7 fixed on the cam shafts 2 and 8. The shaft of sprocket 4 is in turn connected to a pneumatic or hydraulic automatic control device 9, whose piston 10 is secured to the shaft of sprocket 4. The cylinder 9 is suitably connected with the fuel or oil pump of the engine so that at high speeds of the engine crank shaft 11, lever 1 is displaced downwardly and chain 5 takes the position shown in solid lines in the drawing. In this arrangement, the exhaust and inlet valves present the normal lag and advance with respect to the upper dead center position of the piston, as is evident from FIG. 2. In conventional engines, this relationship is maintained at high and low speeds. According to the present invention, however, at low engine speeds, lever 1 is displaced upwardly and chain 5 assumes the position as shown in dotted lines in the drawing in which the cam shafts 2 and 8 undergo a supplementary rotation, the cam shaft 2 controlling the exhaust valve turning clockwise, and the cam shaft 8 controlling the inlet valve turning counter-clockwise. Consequently, the timing operation of the valves present, respectively, a lead or advance in the case of the exhaust valve, and a lag or delay in the case of the inlet valve, as is evident from FIG. 3—compared, of course, with the timing of the valves at high speeds.

The stroke of the lever 1 is arranged so that, with the engine at its lowest or idle speed, the exhaust valve 3 and the inlet valve 12 are both closed at the upper dead center position of the piston.

The operation is as follows:

As long as the speed of the engine is high, the fluid pressure in the cylinder 9 is such as to maintain the lever 1 lowered and hence the chain stretchers 4 and 4′ in the positions indicated in solid lines in the drawing, and the engine operates with normal timing, that is, with advance during intake and lag during exhaust, without producing a high percentage of CO in the exhaust gases.

Figure 1:
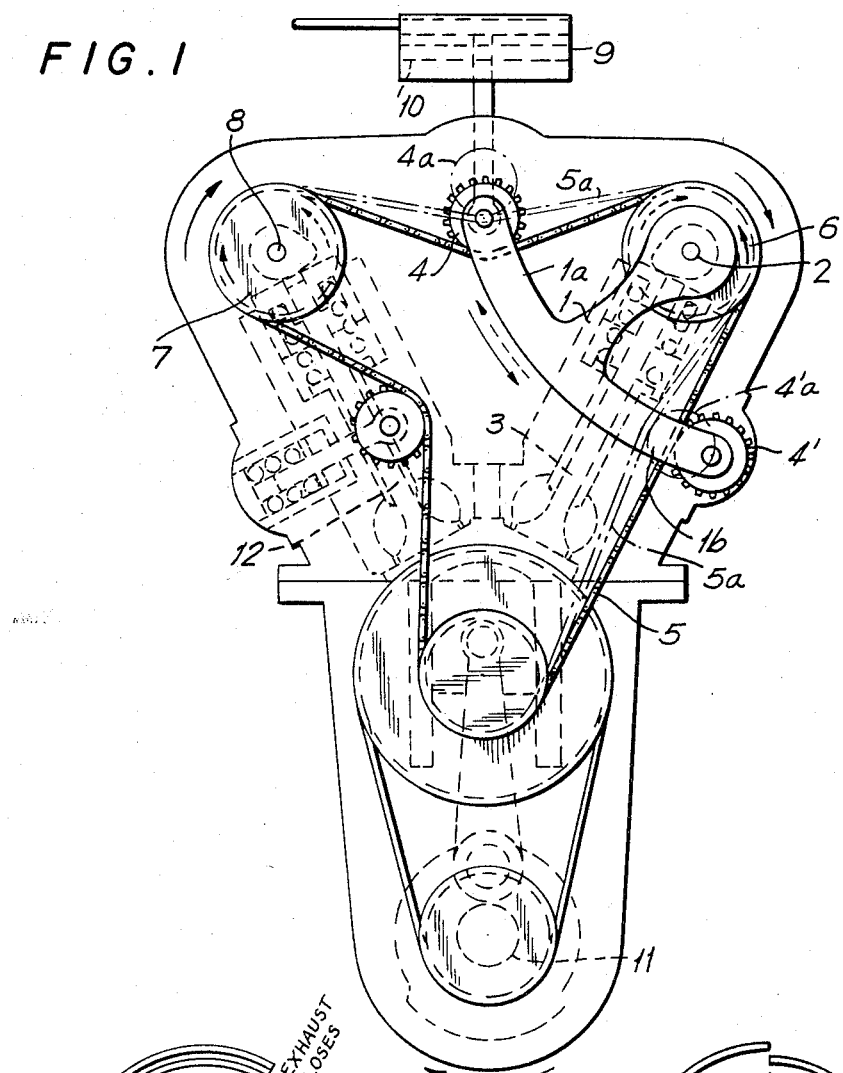
FIGURE 1 is a side view of the device according to the invention applied to a vertical cylinder mounted above the engine crank shaft.

When, on the other hand, the speed of the engine is low, the fluid pressure in the cylinder 9 decreases, and the piston 10 raises lever 1 bringing the sprockets 4 and 4' and the chain 5 progressively into the respective positions indicated in dotted lines in FIG. 1, thus causing the desired correction of the timing so that the inlet valve opens at the upper dead center and the exhaust valve closes at the upper dead center of the piston, i.e. for the engine at its lowest or idle speed.

The device 9 for control of lever 1 may suitably be replaced by an electrical, centrifugal or other equivalent device.

The device according to the present invention may also be suitably applied to engines with a single cam shaft. In such case, it is sufficient to vary the tappet clearance rather than the relative rotational position of the cam shaft.

In practice, the details of execution may vary in equivalent manner in form, dimensions, arrangements of the elements, nature of the material used, without exceeding the spirit and scope of the invention.

What is claimed is:

1. Apparatus for automatically regulating the timing of the opening and closing of the inlet and exhaust valves of a four cycle internal combustion engine, said apparatus comprising means responsive to the speed of the internal combustion engine, means coupled to the latter means for automatically regulating the timing of the valves in relation to the engine speed such that at idle speed the valves are open at separate times and there is no overlap between their openings, rotatable cam means acting on each valve for controlling operation thereof, and a transmission member acting on said cam means to drive the same, said means for automatically regulating the timing of the valves including means acting on the transmission member to impart a supplemental rotation on the cam means as the engine speed is reduced which causes timing advance of the exhaust valve and timing retardation of the inlet valve; each cam means including a driven cam shaft, said transmission member being an endless drive chain for the driving of said cam shafts, said drive chain traveling along a path around said cam shafts and defining a plurality of branches, said means acting on the transmission member comprising a two-armed lever rotatably mounted on one of the cam shafts and coupled to the means which is responsive to the engine speed whereby the lever undergoes rotation in relation to the engine speed, and means on each arm of the lever engaging respective branches of the drive chain for distorting said branches in accordance with rotation of the lever to cause supplemental rotation of the cam shafts.

2. Apparatus as claimed in claim 1 wherein said lever causes gradual advance of the opening of the inlet valve and gradual retarding of the closing of the exhaust valve as the engine speed increases.

3. Apparatus as claimed in claim 1 wherein said two-armed lever is constructed to apply supplemental rotation on the cam means of a magnitude such that at idle speed of the engine, the inlet valve opens at upper dead center position of the piston and the exhaust valve closes thereat.

4. Apparatus as claimed in claim 1 wherein said means on each arm of the lever is a loosely mounted sprocket in engagement with a respective branch of said chain.

5. Apparatus as claimed in claim 4 wherein said arms of the lever are arranged in relation to the branches of the chain such that the sprockets engage their respective branches of the chain from the outside thereof whereby rotation of the lever causes one sprocket to inwardly deform its associated branch and the other sprocket to relieve its associated branch and enable it to tend to straighten.

6. Apparatus as claimed in claim 1 wherein said two armed lever is mounted for rotation on the cam shaft controlling the operation of the exhaust valve.

7. Apparatus as claimed in claim 1 wherein said means which is responsive to the engine speed comprises a piston-cylinder arrangement coupled to said lever.

8. Apparatus as claimed in claim 7 wherein the piston of the piston-cylinder arrangement is coupled to the lever to rotate the same, the cylinder of the piston-cylinder arrangement being supplied with a fluid under a pressure related to engine speed to displace the piston in corresponding amounts.

References Cited

UNITED STATES PATENTS

| 1,863,875 | 6/1932 | Rabezzana. |
| 1,925,755 | 8/1933 | Hemmingsen. |
| 2,279,413 | 4/1942 | Read. |
| 2,685,281 | 8/1954 | MacGregor. |
| 2,692,588 | 10/1954 | Cathers. |
| 3,144,009 | 8/1964 | Goodfellow et al. |

FOREIGN PATENTS

| 549,175 | 11/1942 | Great Britain. |
| 716,997 | 10/1954 | Great Britain. |
| 1,024,846 | 4/1966 | Great Britain. |

WENDELL E. BURNS, *Primary Examiner.*

U.S. Cl. X.R.

12—111, 114